(12) United States Patent
Mihalic et al.

(10) Patent No.: US 6,354,611 B1
(45) Date of Patent: Mar. 12, 2002

(54) TRAVELING PICNIC TABLE

(76) Inventors: Tammy Mihalic; Landis Mihalic, both of 383 Bridle Path La., Ormond Beach, FL (US) 32174

( * ) Notice: Subject to any disclaimer, the term of this patent is extended or adjusted under 35 U.S.C. 154(b) by 0 days.

(21) Appl. No.: 09/573,471

(22) Filed: May 17, 2000

(51) Int. Cl.$^7$ ................................................ B62B 3/02
(52) U.S. Cl. .................... 280/30; 280/47.11; 280/47.34
(58) Field of Search .................. 280/30, 47.11, 280/47.35, 47.371, 47.34, 79.2, 655; 62/457.7; 296/22

(56) References Cited

U.S. PATENT DOCUMENTS

| | | | |
|---|---|---|---|
| D182,822 S | 5/1958 | Kempner | D33/14 |
| 3,395,936 A | 8/1968 | Nicolli | 296/23 |
| 3,741,606 A * | 6/1973 | Grier | 296/22 |
| 3,827,708 A | 8/1974 | Derry | 280/36 |
| 3,940,175 A * | 2/1976 | Robison | 296/22 |
| 4,511,174 A * | 4/1985 | Walker | 296/173 |
| 4,735,426 A | 4/1988 | McConnell | 280/87.01 |
| 4,801,175 A * | 1/1989 | Albanese | 297/124 |
| D299,796 S * | 2/1989 | White | D6/337 |
| 5,269,157 A | 12/1993 | Ciminelli et al. | 62/457.7 |
| 5,423,195 A | 6/1995 | Peters | 62/457.7 |
| 5,465,985 A | 11/1995 | Devan et al. | 280/30 |
| 5,465,996 A | 11/1995 | Wisz | 280/651 |
| 5,480,170 A * | 1/1996 | Kaiser, II | 280/30 |
| 5,551,558 A * | 9/1996 | Bureau | 206/223 |
| 5,636,852 A | 6/1997 | Sistrunk et al. | 280/30 |
| 5,660,403 A | 8/1997 | O'Neill et al. | 280/47.19 |
| 5,833,251 A * | 11/1998 | Peck | 280/87.01 |
| 5,876,047 A * | 3/1999 | Dennis | 280/47.35 |
| 6,152,461 A * | 11/2000 | Dunks | 280/30 |

* cited by examiner

*Primary Examiner*—J. J. Swann
*Assistant Examiner*—James S. McClellan
(74) *Attorney, Agent, or Firm*—Brian S. Steinberger; Law Offices of Brian S . Steinberger (57) ABSTRACT

A traveling picnic table having a cooler box type wagon body with a hinged lid that doubles as a tabletop. On both sides of the table are bench type seats and legs that can both fold up adjacent to the sides of the cooler, and locking type latches for locking the legs and a down position. Under the cooler body are a fixed set of rear wheels, and a front set of wheels that are pivotally attached to a front undersurface of the cooler body. A longitudinal handle is connected to the front set of pivotal wheels allowing a person to pull and turn the traveling picnic table with ease as the person is walking in front of the traveling picnic table.

19 Claims, 10 Drawing Sheets

TRAVELING PICNIC TABLE

This invention relates to portable tables, and in particular to a cooler-wagon with wheels and a lid-top for the cooler portion that doubles as a table top, along with benches and legs on both sides of the cooler wagon that fold up against the cooler-wagon when not being used.

BACKGROUND AND PRIOR ART

Taking children on picnics has generally required one to bring a cooler and potentially a blanket, chair and the like, in order to be able to have a place to sit. Rectangular cooler boxes for temporary storing foods and beverages have been widely used for beach outings, picnics, nature walks, and other activities. The larger the cooler the more difficult and cumbersome it is to transport the cooler. Wheeled coolers have been proposed for making large coolers more mobile. See for example, U.S. Pat. No. 3,827,708 to Derry; U.S. Pat. No. 5,269,157 to Ciminelli et al.; U.S. Pat. No. 5,423,195 to Peters; U.S. Pat. No. 5,465,985 to Devan et al.; U.S. Pat. No. 5,465,996 to Wisz; and U.S. Pat. No. 5,636,852 to Sistrunk et al. However, these patents do not allow users especially children a place to sit off the ground.

Children's wagons and strollers have been widely used over the years to transport children. See for example, U.S. Pat. No. 4,735,426 to McConnell. However, the inventor is not aware of any child's wagon, and stroller device that would allow for the insulated storage of food necessary for an outing. Additionally, traditional wagons and strollers have a limited seating capability that generally does not allow for more than two seated occupants.

Large picnic tables with large benches have been become widely used. Some of these large picnic tables include wheels. See for example, U.S. Pat. No. 3,395,936 to Nicolli. However, these traditional picnic tables are to large, cumbersome and expensive to be used for taking children on simple outings, such as a picnic, beach trip, and nature walk. Additionally, there is no place on the table for storing foods and beverages.

U.S. Pat. No. 5,660,403 to O'Neill et al. describes a "multipurpose beach cart", that is used as a two wheeled handcart. However, this patent also does not overcome the problems with the other prior art devices described above.

SUMMARY OF THE INVENTION

The first objective of the present invention is to provide a traveling picnic table having wheels and a pull arm for allowing the table to be mobile.

The second object of this invention is to provide a traveling picnic table having seats that can be lowered down when the table is used and are folded up when the table is being moved.

The third object of this invention is to provide a traveling picnic table having a cooler compartment with a lid that can also be used as a tabletop.

A preferred embodiment of the traveling picnic table includes a cooler having a tabletop, seats attached to opposing sides of the cooler, each with legs having a folded position adjacent to the cooler and the legs having a down position with the seat perpendicular to the cooler, along with wheels attached to the cooler. The table top is attached to the cooler by hinges. A locking hinge assembly can lock the tabletop in an open position. Each seat can have two sets of legs, each set can include legs that have a raised folded up position adjacent to the folded seat, and a down position perpendicular to the down positioned seat. Rods can be inserted into channels located on each pair of legs for locking the legs in the down position. The table can further include a handle for attaching to a front portion of the cooler for allowing the table to be pulled.

A front set of wheels pivotally can be attached beneath the cooler, the handle being connected to the front wheels, along with a rear set of wheels attached beneath the cooler.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1A:
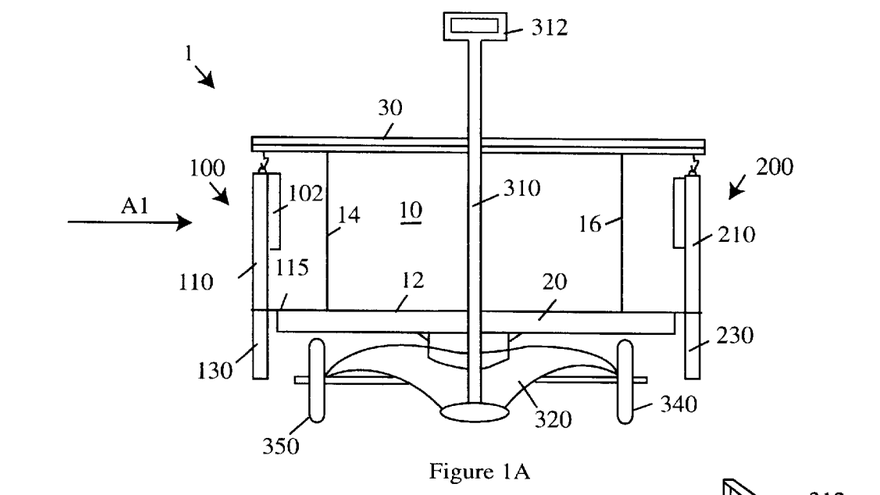
FIG. 1A shows a front view of the traveling picnic table with seat and legs up in a travel position.
Figure 1B:
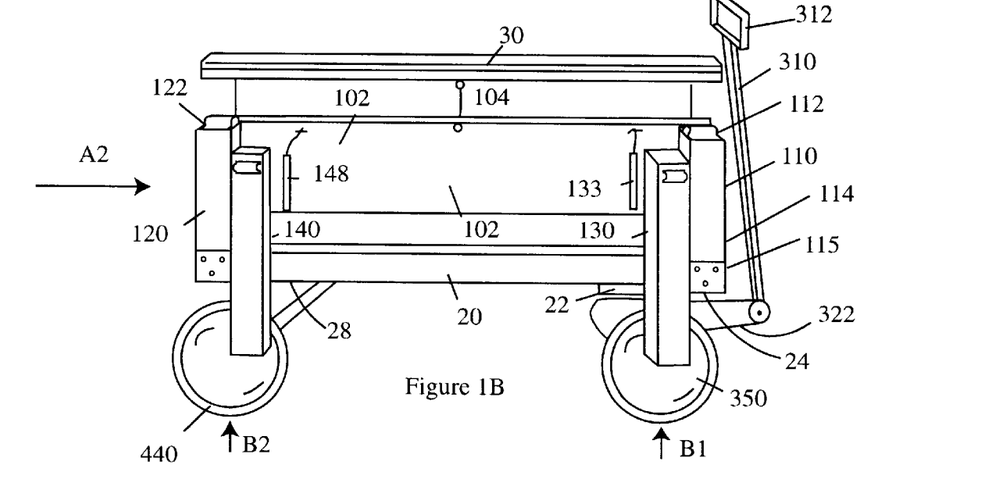
FIG. 1B is a side view of the traveling picnic table of FIG. 1A along arrow A1.
Figure 1C:
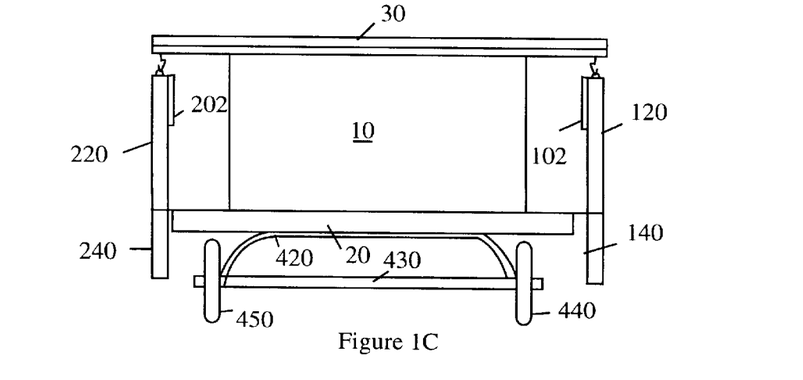
FIG. 1C is an end view of the traveling picnic table of FIG. 1B along arrow A2.
Figure 1D:
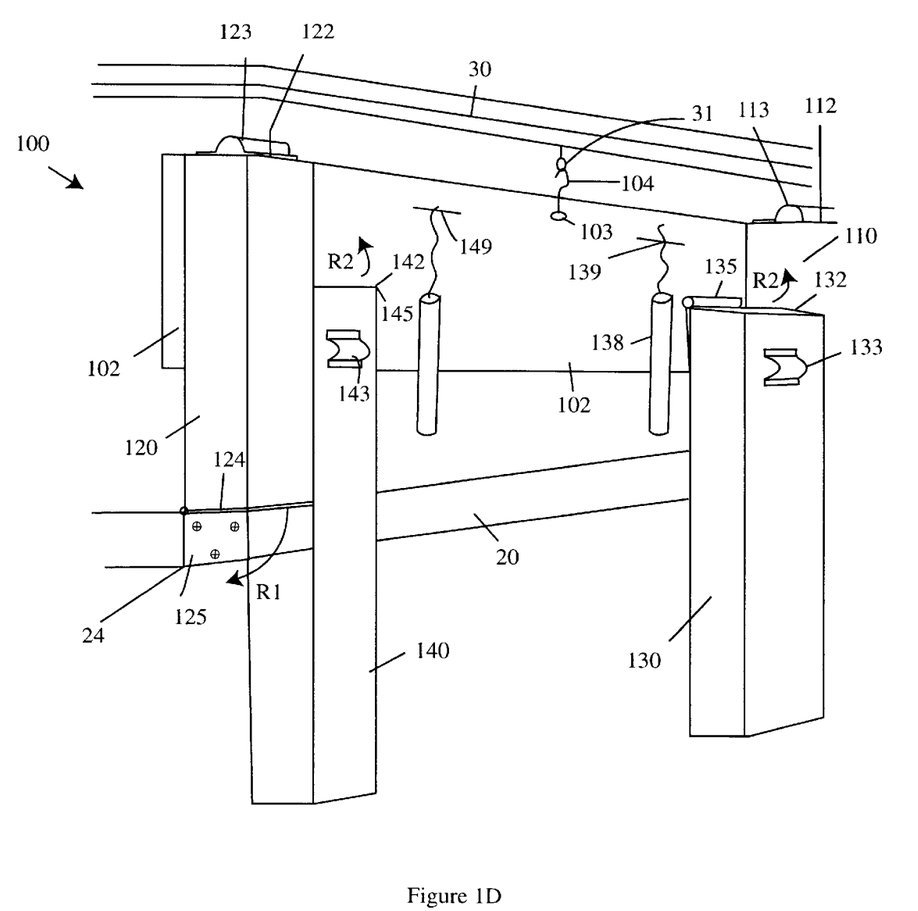
FIG. 1D is an enlarged view of the seat and legs of FIG. 1B in a folded up position.

FIG. 1A shows a front view of the traveling picnic table 1 with seat and legs up in a travel position. FIG. 1B is a side view of the traveling picnic table 1 of FIG. 1A along arrow A1. FIG. 1C is an end view of the traveling picnic table 1 of FIG. 1B along arrow A2. FIG. 1D is an enlarged view of the seat and legs of FIG. 1B in a folded up position.

Referring to FIGS. 1A–1D, picnic table 1 includes a center cooler body 10(which will be described in greater detail in reference to FIGS. 3A–3B) having a base 12 attached to a rectangular frame 20, first seat assembly 100 on one side 14 of the body 10, and an identical second seat assembly 200 on a opposite side 16 of the body 10. In the traveling position, a fastener 103 is attached to a base of a J-hook 104 that can hook into a loop fastener 31 attached to a lower edge of the tabletop 30. First seat assembly 100 includes a longitudinal planar bench board 102 that is fixably attached at the undersurface to upper bench support rectangular seat brace legs 110 and 120. Top ends 112, 122 of upper legs 110, 120 have channels 113, 123, respectively attached thereto, while the bottom ends 114, 124 of upper legs 110, 120 are attached to hinges 115, 125, respectively. The hinges 115, 125 are also attached to edges 24 of rectangular frame 20, so that legs 110, 120 pivot and rotate in the direction of arrow R1 relative to edges 22, 24 of frame 20. Lower support legs 130, 140 each have top ends 132, 142 which connect by hinges 135, 145 to the undersurface of planar bench board 102. Channels 133, 143 are attached to an exterior side of legs 130, 140. Lower support legs 130, 140 can pivot and rotate in the direction of arrow R2, while legs 110, 120 rotate in the direction of arrow R1 so that channels 123, 143 align together, and channels 113, 133 align together. Dual rods 148, 138 are connected to the underside of board 102 by stapled lines 139, 149, can be used to lock the channels 123, 143 together, and lock channels 113, 133 together when the seat 102 and legs 110, 120, 130, 140 are in a down position as shown and described in reference to FIGS. 4A–4G. Second seat assembly 200 includes seat portion 202, and leg components 210, 220, 230, 240 that correspond and function similar to the like components of first seat assembly 100.

Figure 2A:
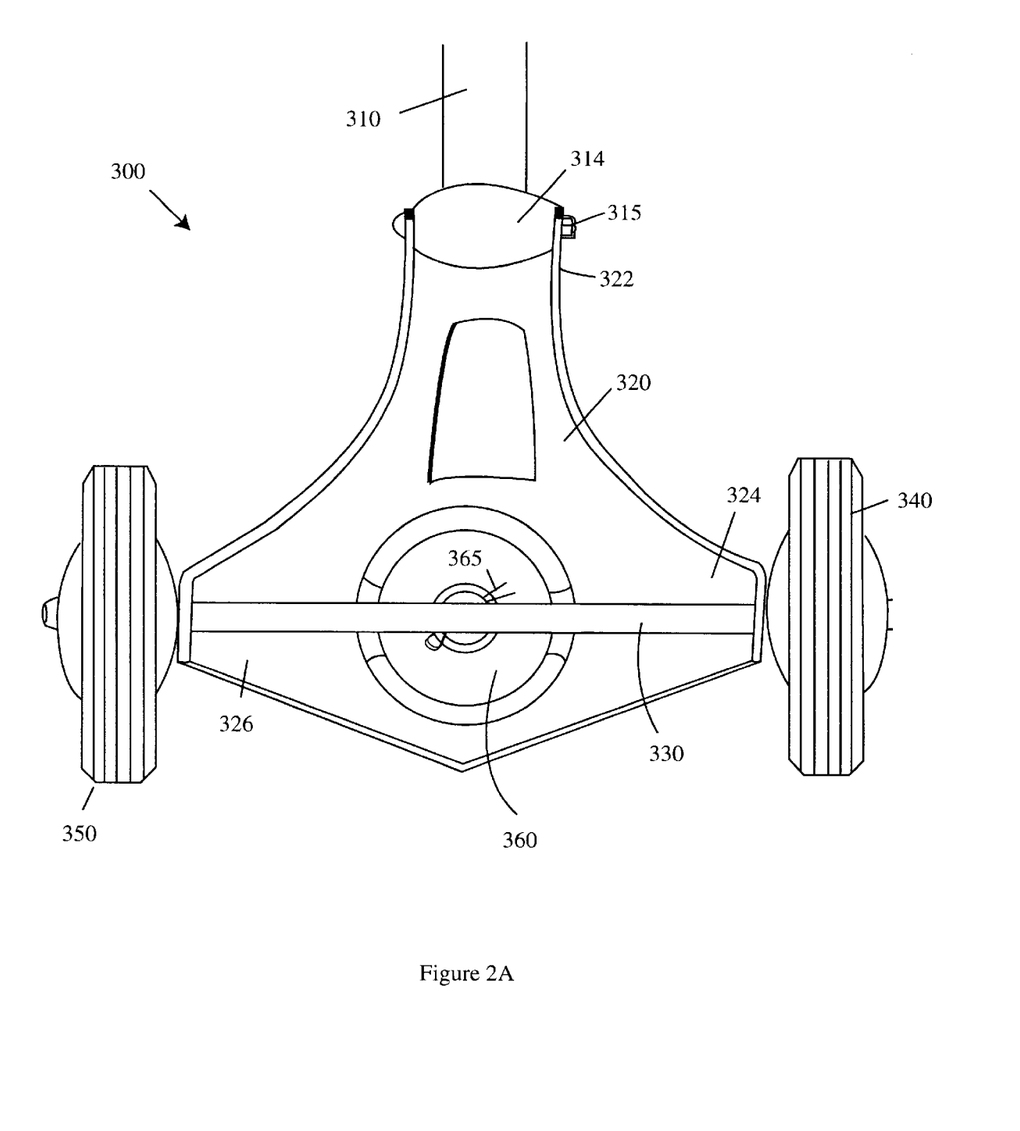
FIG. 2A is a bottom enlarged view of the front wheel assembly of FIG. 1B along arrow B1.

FIG. 2A is a bottom enlarged view of the front wheel assembly 300 of FIG. 1B along arrow B1. Referring to FIGS. 1A, 1B and 2A, front wheel assembly includes an elongated handle 310 having an upper grip end 312 and a lower end 314 connected to a base 322 of T-shaped base by a pivot pin 315 allowing the handle 310 to pivot relative to base 320. Opposing ends 324, 326 of base 320 support an axle 330, the ends of which are rotatably attached to wheels 340, 350. A swivel base 360 attached to the T-shaped base 320 by a cotter type pin 365, allows the T-shaped base 320 to rotate relative to the swivel base 360, the latter of which is fixably attached to an underside front portion 22 of frame 20.

Figure 2B:
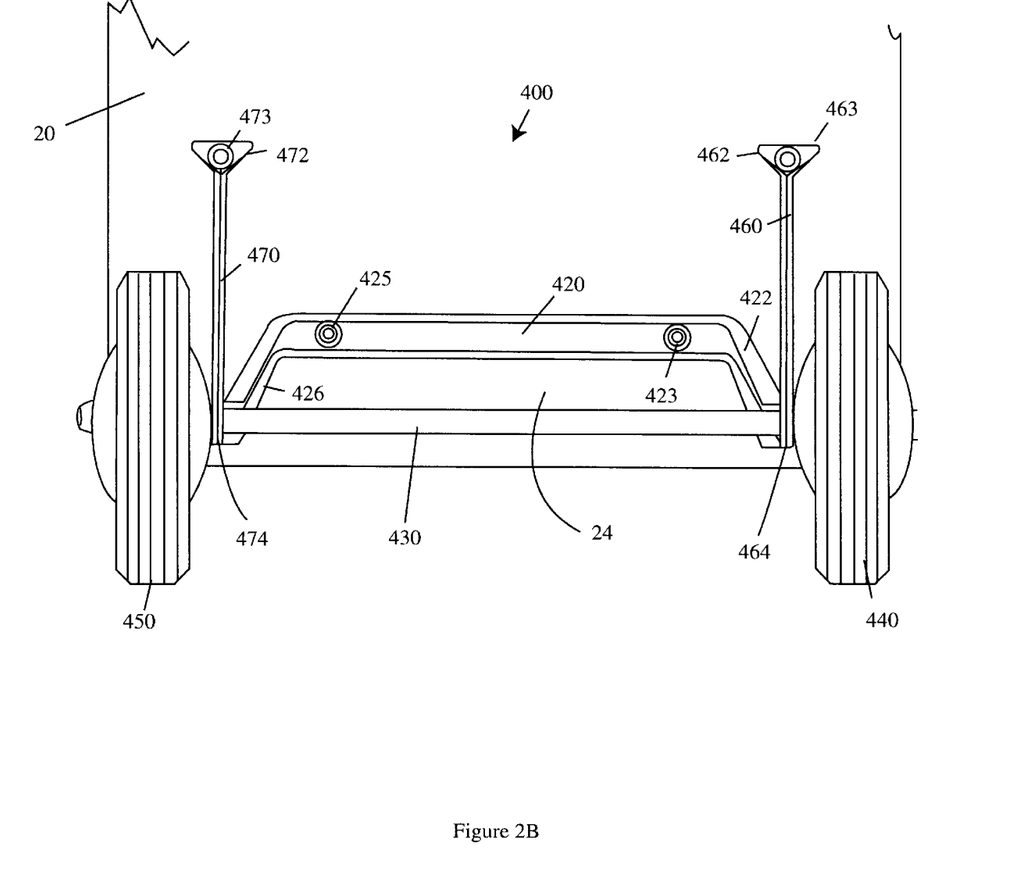
FIG. 2B is a bottom enlarged view of the rear wheel assembly of FIG. 1B along arrow B2.

FIG. 2B is a bottom enlarged view of the rear wheel assembly 400 of FIG. 1B along arrow B2. Referring to FIGS. 1B, 1C and 2B, rear wheel assembly 400 includes a U-shaped bracket 420 attached to an underside rear portion 28 of frame 20 by screw type fasteners 423, 425. Downwardly protruding members 422, 426 attach the bracket 420 to an axle 430. Angled strut supports 460, 470 have one end 462, 472 attached to the underside 24 by screw type fasteners 463, 473, respectively, and opposite ends 464, 474 wrapped about portions of axle 430. On opposite ends of axle 430 are attached rotatable wheels 440, 450, respectively.

Figure 3A:
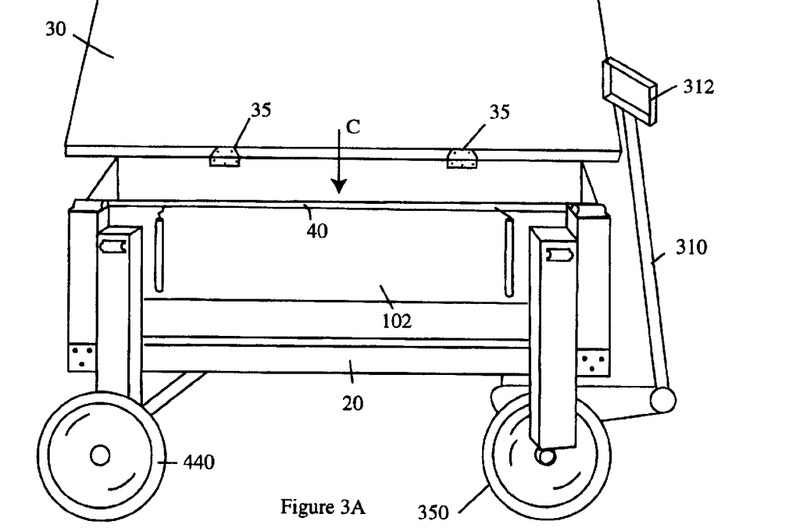
FIG. 3A is a side view of the table of FIG. 1B with the tabletop lid lifted up to expose the cooler.
Figure 3B:
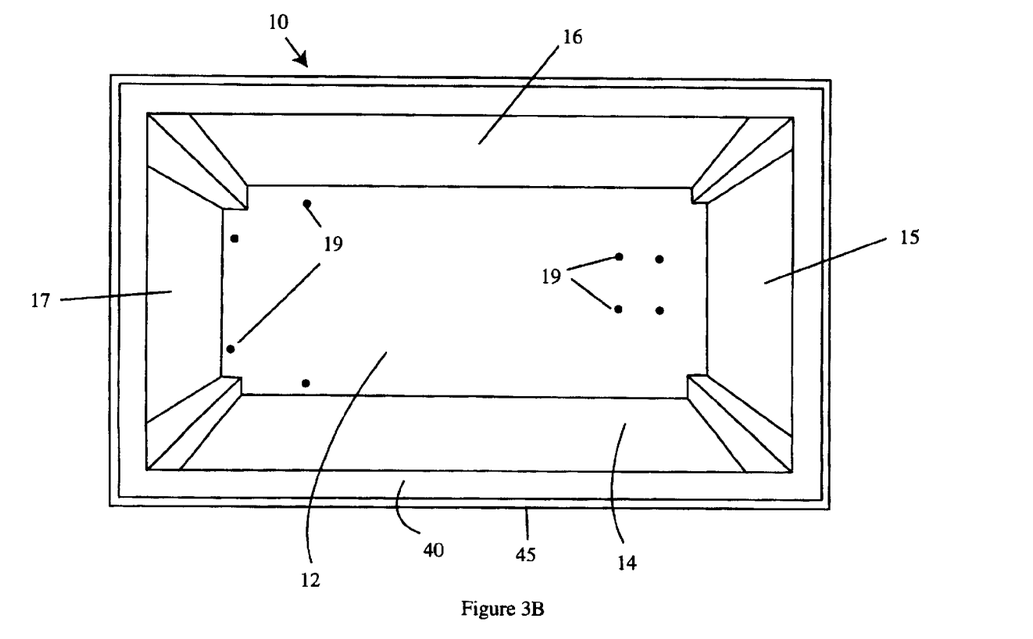
FIG. 3B is a view of the cooler of FIG. 4A along arrow C.

FIG. 3A is a side view of the table of FIG. 1B with the tabletop lid 30 lifted up to expose the interior of center cooler body 10. FIG. 3B is a top view of the interior of the center cooler body 10 of FIG. 4A along arrow C. Tabletop lid 30 is connected to cooler body 10 by dual hinges 35. An upper edge rim 40 that can have an optional rubber seal strip 45 can allow lid 30 to seal when in a closed position against rim 40. The interior of cooler body 10 can be a rectangular opening formed from bottom 12, and four sides 14, 15, 16 and 17. Screw type fasteners 19 can be used to secure cooler body 10 to platform 20.

Figure 4A:
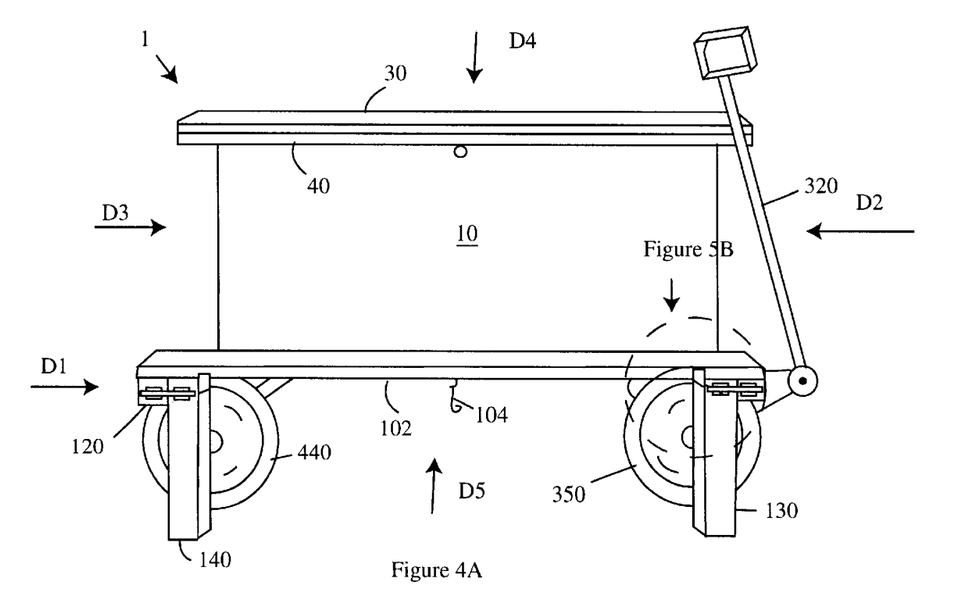
FIG. 4A is a side view of the table of the preceding figures with seat and legs in a down position.
Figure 4B:
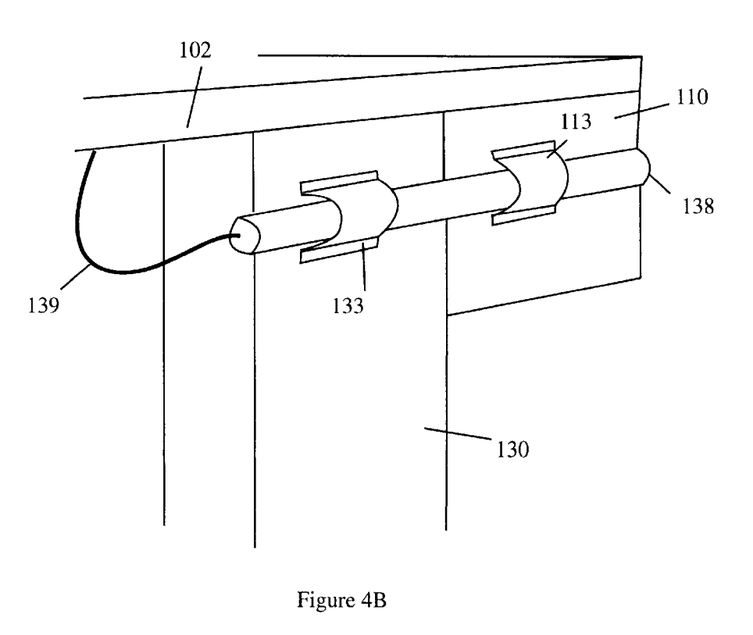
FIG. 4B is an enlarged view of one of the leg and seat fastener regions shown in FIG. 5A.
Figure 4C:
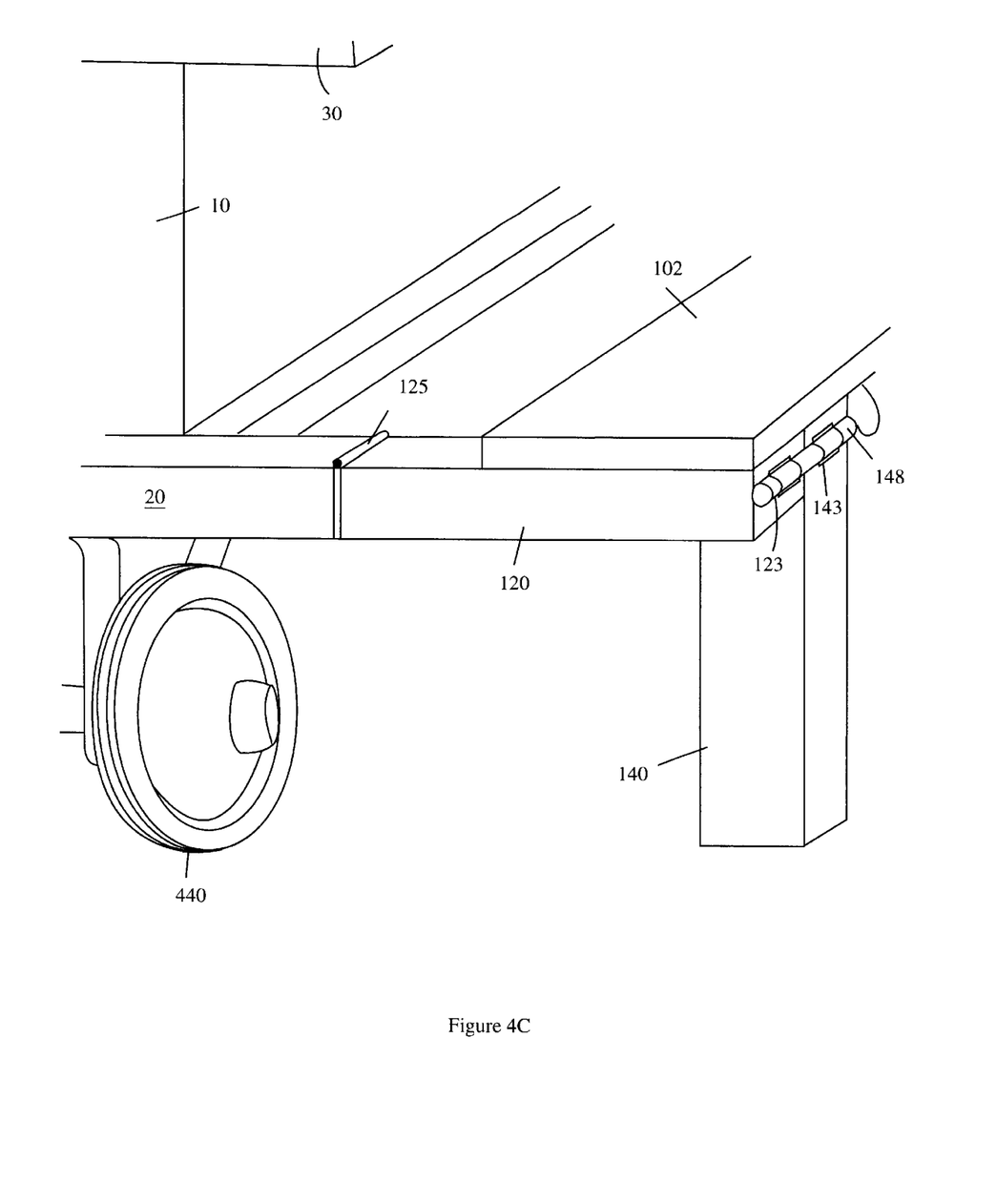
FIG. 4C is an enlarged view of a corner of FIG. 5A along arrow D1.
Figure 4D:
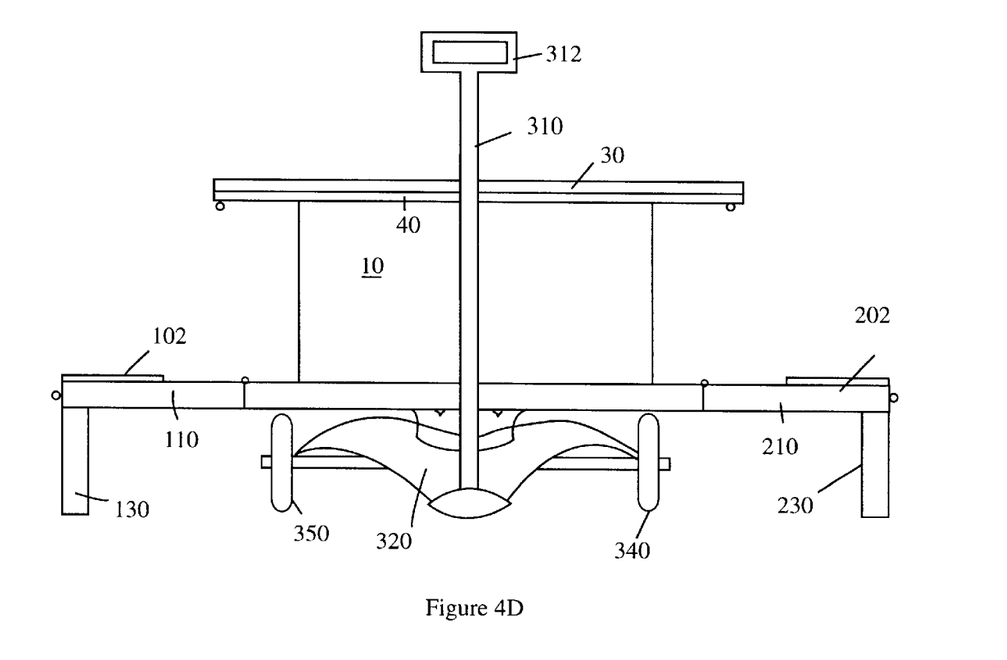
FIG. 4D is a front end view of the table of FIG. 4A along arrow D2.
Figure 4E:
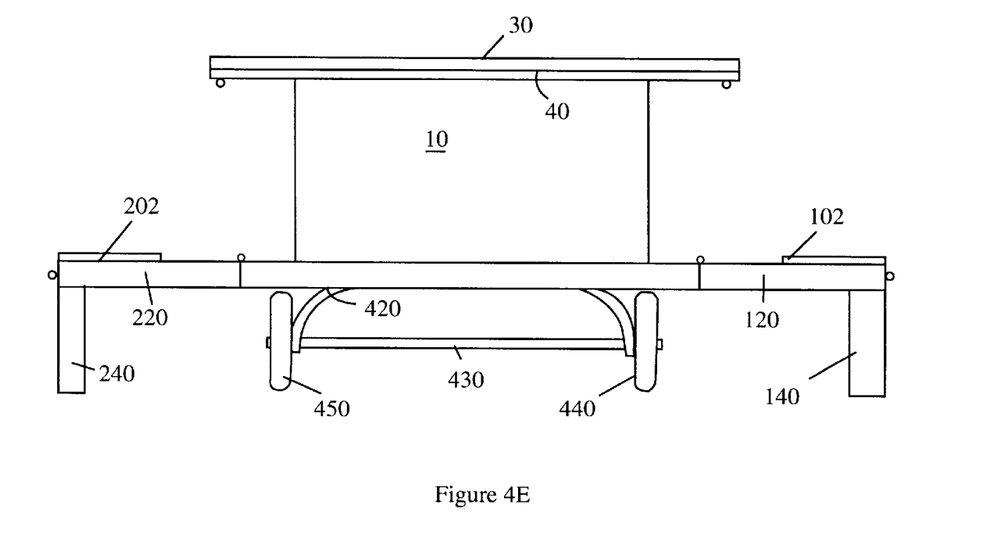
FIG. 4E is a rear end view of the table of FIG. 4A along arrow D3.
Figure 4F:
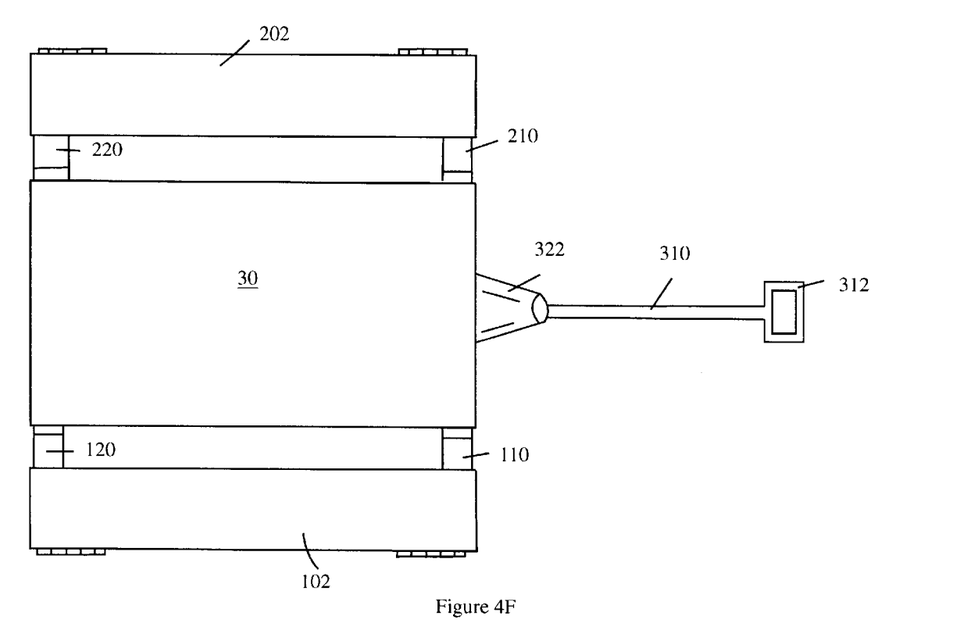
FIG. 4F is a top view of the table of FIG. 4A along arrow D4.
Figure 4G:
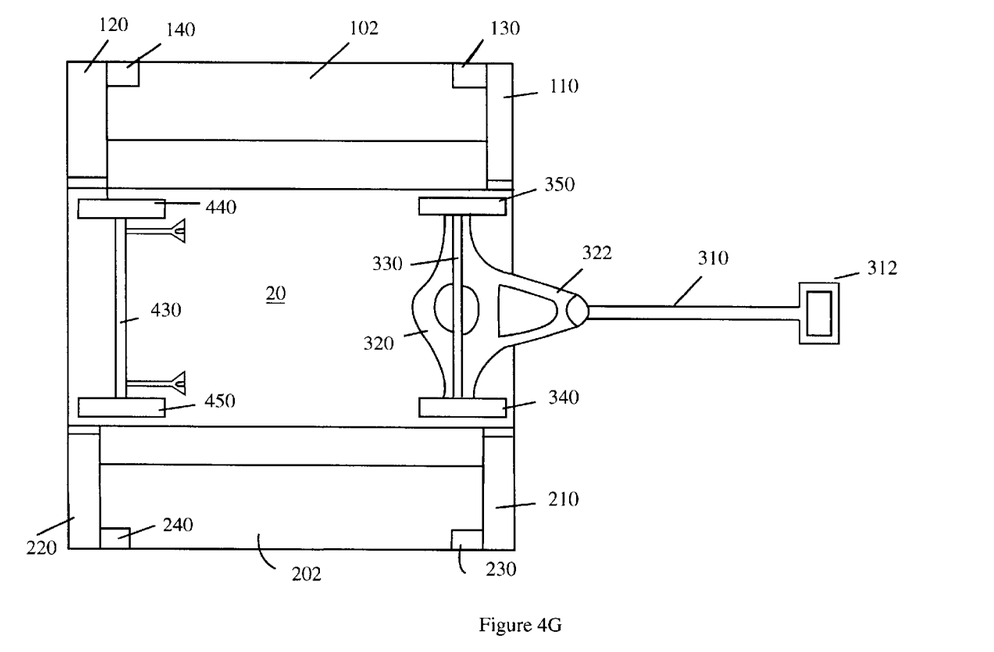
FIG. 4G is a bottom view of the table of FIG. 4A along arrow D5.

FIG. 4A is a side view of the table 1 of the preceding figures with seat 102 and legs 110 and 130, 120 and 140 in a down position. FIG. 4B is an enlarged view of one of the leg sets 110, 130 and seat 102 shown in FIG. 5A, with the dial rod 138 inserted into and locking channels 113 and 133 adjacent to one another. FIG. 4C is an enlarged view of a corner of FIG. 4A along arrow D1, where seat 102 is supported on upper leg 120 which is locked perpendicular to lower leg 140 by a rod 148 that is inserted into channels 123, 143. FIG. 4D is a front end view of the table 1 of FIG. 4A along arrow D2. FIG. 4E is a rear end view of the table 1 of FIG. 4A along arrow D3. FIG. 4F is a top view of the table 1 of FIG. 4A along arrow D4. FIG. 4G is a bottom view of the table 1 of FIG. 4A along arrow D5.

Figure 5A:
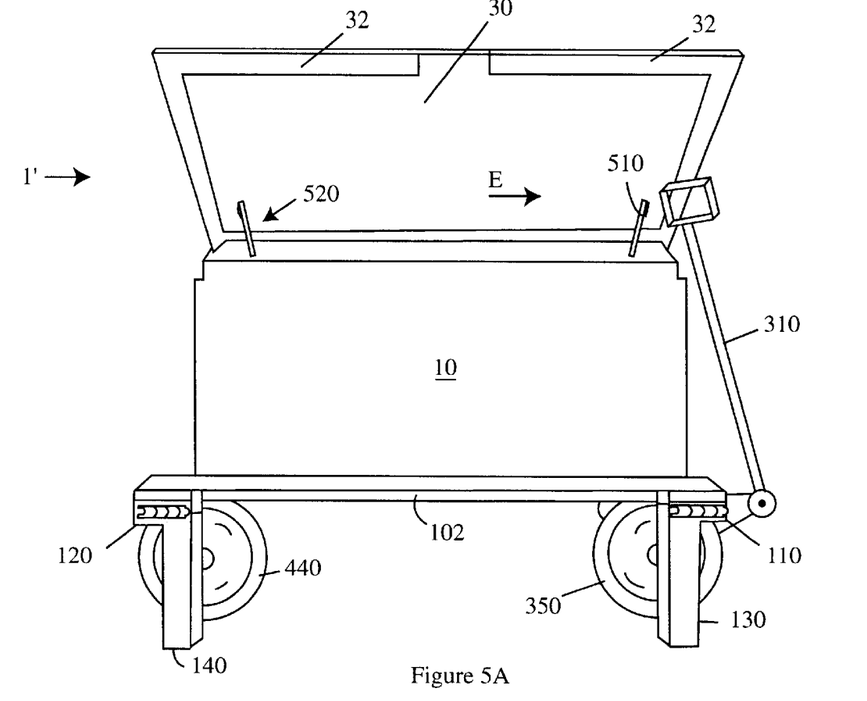
FIG. 5A is a side view of the table of FIG. 4A with the tabletop lid lifted up with hinge locks.
Figure 5B:
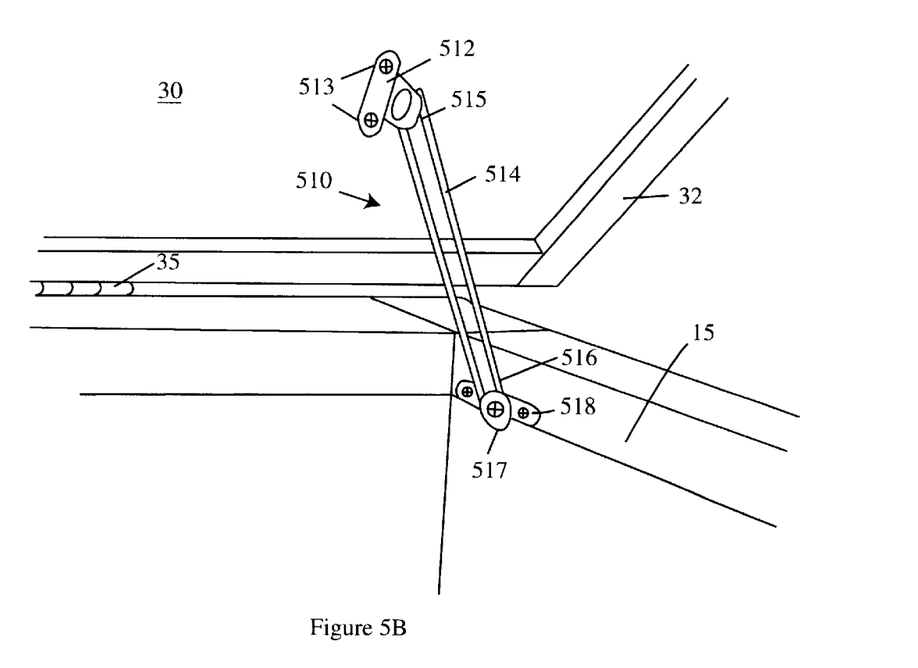
FIG. 5B is an enlarged view of the hinge lock of FIG. 5A along arrow E.

FIG. 5A is a side view of the table 1' of FIGS. 3A and 4A with the tabletop lid 30 lifted up with hinge locks 510, 520. FIG. 5B is an enlarged view of one of the hinge locks 510 of FIG. 5A along arrow E. A longitudinal loop bar 514 has one end 515 pivotally connected to an upper base portion 512 that is fixably attached to an underside of lid 30 by screw type fasteners 513. The opposite end 516 of loop bar 514 can slide relative to lower base portion 518 which is fixably attached to an inside wall 15 of cooler body 10. A nut 517 can be tightened and lock loop bar 514 to base portion 518 to hold the lid 30 in an open position. An optional seal strip 32 can be used to help seal lid 30 relative to the cooler body 10.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A traveling picnic table, comprising:
    a cooler having a tabletop;
    a first bench seat attached by a first hinge adjacent to a bottom of one side of the cooler having a folded up position parallel to the side of the cooler and a folded down position with the first bench seat perpendicular to the cooler;
    a first leg attached by a second hinge to the first bench seat having a folded position parallel to the first bench seat and a down position with the first leg perpendicular to the first bench seat; and
    wheels attached to the cooler.

2. The traveling picnic table of claim 1, further comprising:
    a hinge for attaching the tabletop to the cooler.

3. The traveling picnic table of claim 2, further comprising:
    means for locking the tabletop in an open position.

4. The traveling picnic table of claim 1, further comprising:
    a second bench seat attached by a third hinge to another side of the cooler having a folded up position adjacent to the cooler and a folded down position with the second bench seat perpendicular to the cooler;
    a second leg attached by a fourth hinge to the second bench seat having a folded position adjacent to the second bench seat and a folded down position with the second leg perpendicular to the second bench seat.

5. The traveling picnic table of claim 1, wherein the first bench seat includes:

first means for locking the first leg in the down position.

6. The traveling picnic table of claim 1, further comprising:

a handle for attaching to a front portion of the cooler for allowing the table to be pulled.

7. The traveling picnic table of claim 6, further comprising:

front wheels pivotally attached beneath the cooler, the handle being connected to the front wheels; and rear wheels fixably attached beneath the cooler.

8. The traveling picnic table of claim 1, further comprising:

a single fastening means attached to the first bench seat for holding the first bench seat in the folded position.

9. The traveling picnic table of claim 8, wherein the single fastening means includes:

hook and loop fastener attached to a mid-portion adjacent to an outer side edge of the first bench seat.

10. A traveling picnic table comprising in combination:

a cooler having a tabletop;

a first bench seat;

a first bench hinge for attaching the first bench seat adjacent to a bottom of a first side of the cooler, the first bench hinge being limited to rotating solely between an open position and a closed position, the open position of the first bench hinge allowing the first bench seat to have a folded position parallel to the side of the cooler and the closed position of the first bench hinge limits the first bench seat to have a folded down position with the first bench seat perpendicular to the side of the cooler;

a first lower leg foldably attached to the first bench seat that has a raised folded up position parallel to the folded first bench seat in the folded position, and a down position perpendicular to the first bench seat in the down position; and wheels attached to the cooler.

11. The traveling picnic table of claim 10, further comprising:

a handle for attaching to a front portion of the cooler for allowing the table to be pulled.

12. The traveling picnic table of claim 11, further comprising:

front wheels pivotally attached beneath the cooler, the handle being connected to the front wheels; and rear wheels fixably attached beneath the cooler.

13. The traveling picnic table of claim 10, further comprising:

means to lock the first leg in the down position.

14. The traveling picnic table of claim 10, further comprising:

a first upper support leg fixably attached to an undersurface portion of the first bench seat, and the first bench hinge attached to an end portion of the first upper support leg.

15. The traveling picnic table of claim 10, further comprising:

a first leg hinge for attaching the first lower leg to the first bench seat, the first leg hinge being limited to rotating solely between an open position and a closed position, the open position of the first leg hinge allowing the first lower leg to have a folded position adjacent to the first bench seat and the closed position of the first leg hinge limits the first lower leg to have a folded down position with the first lower leg perpendicular to the first bench seat.

16. The traveling picnic table of claim 10, further comprising:

a second bench seat;

a second bench hinge for attaching the second bench seat to a second side of the cooler opposite to the first side of the cooler, the second bench hinge being limited to rotating solely between an open position and a closed position, the open position of the second bench hinge allowing the second bench seat to have a folded position adjacent to the cooler and the closed position of the second bench hinge limits the second bench seat to have a folded down position with the second bench seat perpendicular to the cooler; and a second lower leg foldably attached to the second bench seat that has a raised folded up position adjacent to the folded second bench seat in the folded position, and a down position perpendicular to the second bench seat in the down position.

17. The traveling picnic table of claim 16, further comprising:

a first leg hinge for attaching the first lower leg to the first bench seat, the first leg hinge being limited to rotating solely between an open position and a closed position, the open position of the first leg hinge allowing the first lower leg to have a folded position adjacent to the first bench seat and the closed position of the first leg hinge limits the first lower leg to have a folded down position with the first lower leg perpendicular to the first bench seat; and a second leg hinge for attaching the second lower leg to the second bench seat, the second leg hinge being limited to rotating solely between an open position and a closed position, the open position of the second leg hinge allowing the second lower leg to have a folded position adjacent to the second bench seat and the closed position of the second leg hinge limits the second lower leg to have a folded down position with the first lower leg perpendicular to the first bench seat.

18. The traveling picnic table of claim 10, further comprising:

a single fastening means attached to the first bench seat for holding the first bench seat in the folded position.

19. The traveling picnic table of claim 18, wherein the single fastening means includes:

hook and loop fastener attached to a mid-portion adjacent to an outer side edge of the first bench seat.

* * * * *